Dec. 16, 1958    P. E. MARSHALL    2,864,515
AUTOMOBILE PARKING APPARATUS
Filed April 19, 1954    7 Sheets-Sheet 1
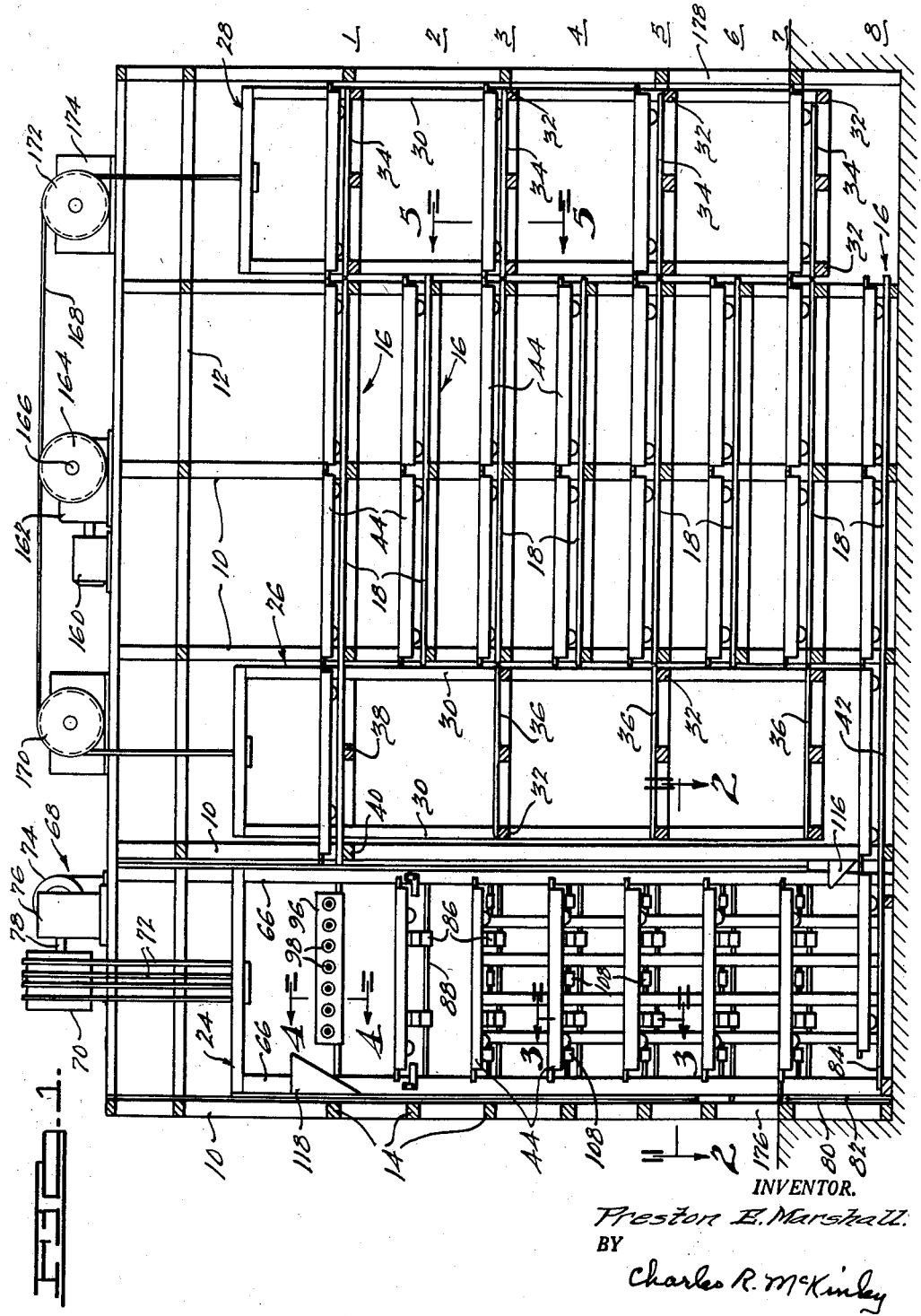
INVENTOR.
Preston E. Marshall.
BY
Charles R. McKinley
ATTORNEY.

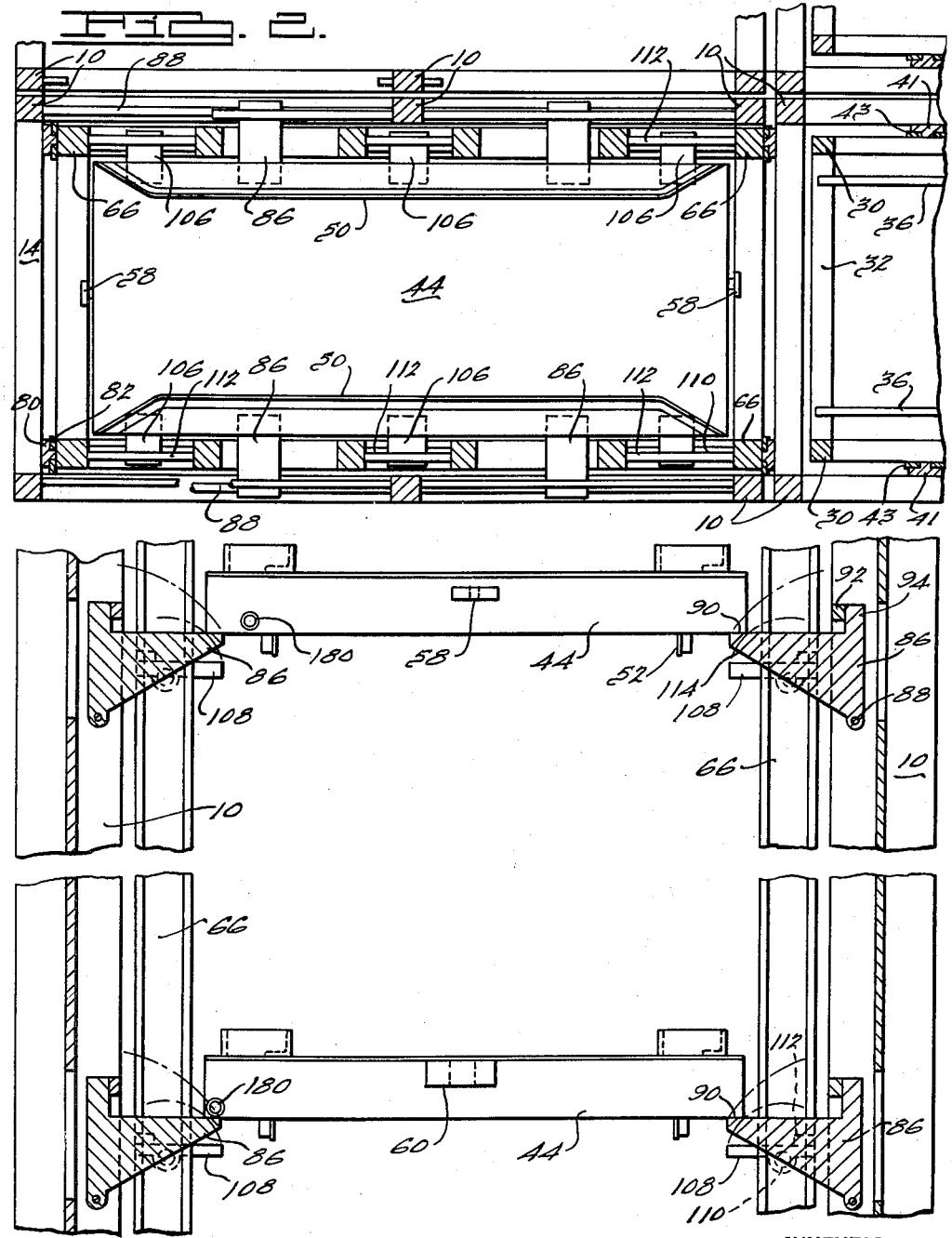

Dec. 16, 1958 P. E. MARSHALL 2,864,515
AUTOMOBILE PARKING APPARATUS
Filed April 19, 1954 7 Sheets-Sheet 3
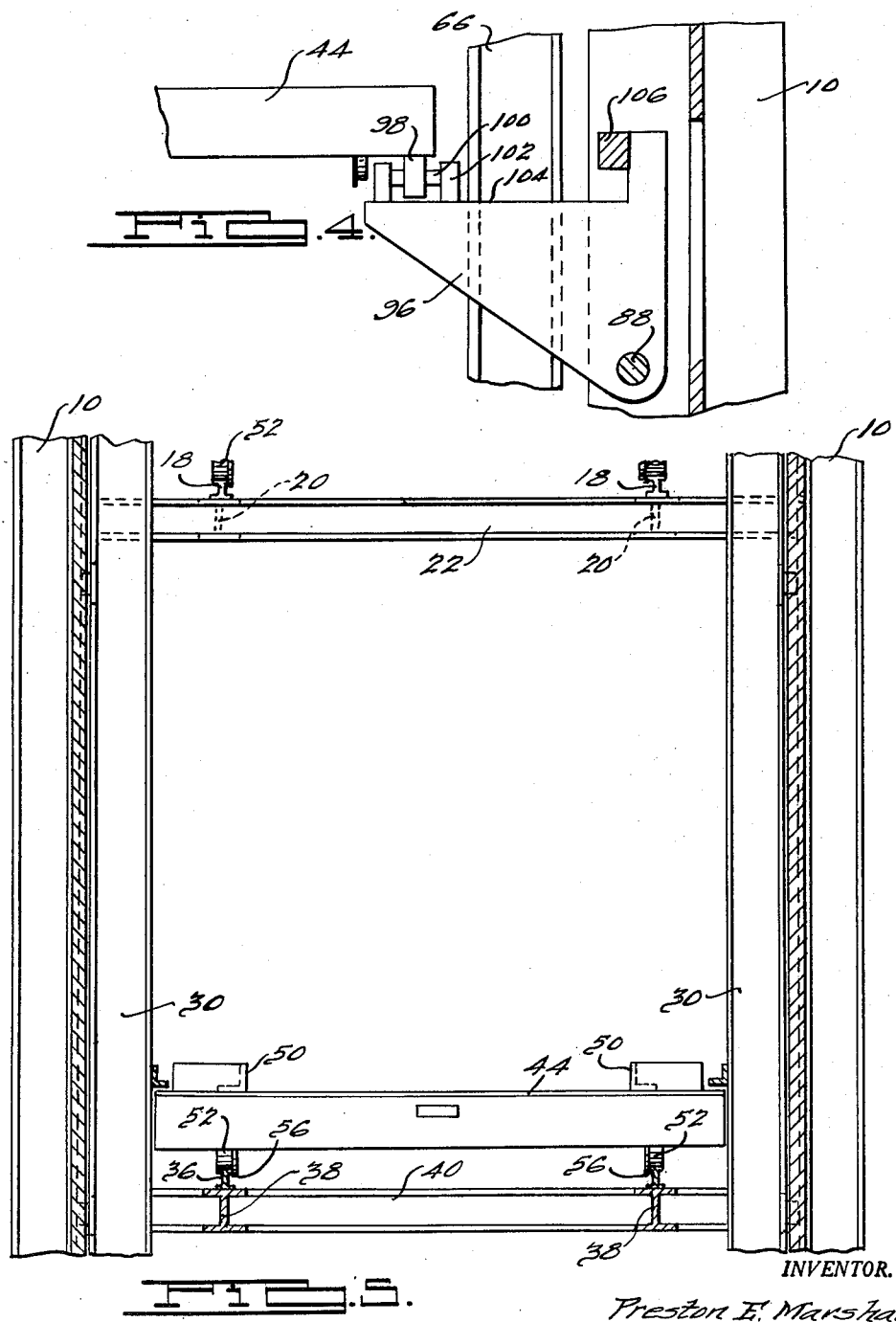
INVENTOR.
Preston E. Marshall.
BY
Charles R. McKinley
ATTORNEY.

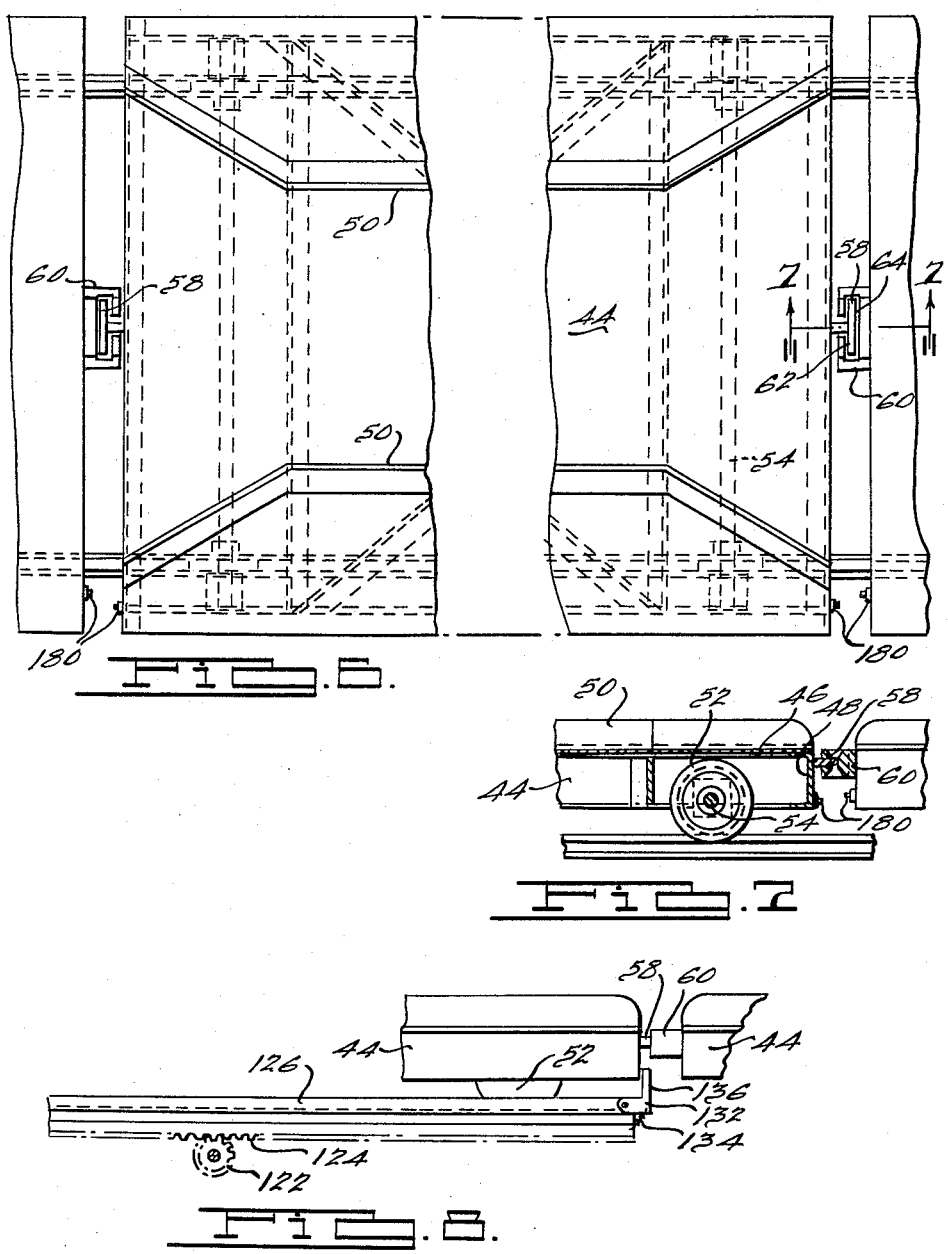

Dec. 16, 1958     P. E. MARSHALL     2,864,515
AUTOMOBILE PARKING APPARATUS
Filed April 19, 1954                   7 Sheets-Sheet 5
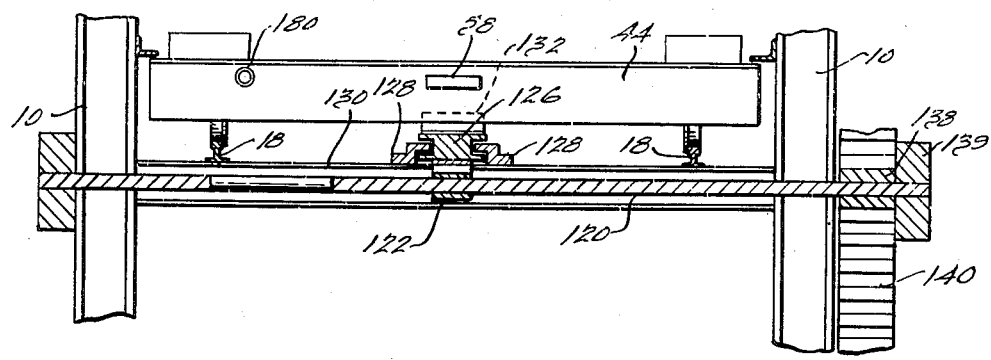
FIG. 9.
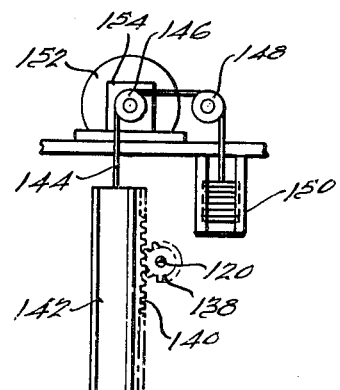
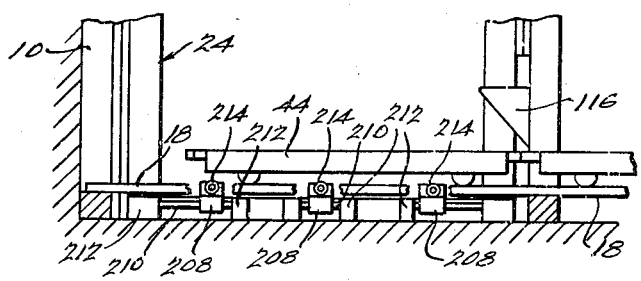
FIG. 15.
FIG. 10.
INVENTOR.
Preston E. Marshall.
BY
Charles R. McKinley
ATTORNEY.

Dec. 16, 1958 P. E. MARSHALL 2,864,515
AUTOMOBILE PARKING APPARATUS
Filed April 19, 1954 7 Sheets-Sheet 6

INVENTOR.
Preston E. Marshall.
BY
Charles R. McKinley
ATTORNEY.

Dec. 16, 1958    P. E. MARSHALL    2,864,515
AUTOMOBILE PARKING APPARATUS
Filed April 19, 1954    7 Sheets-Sheet 7
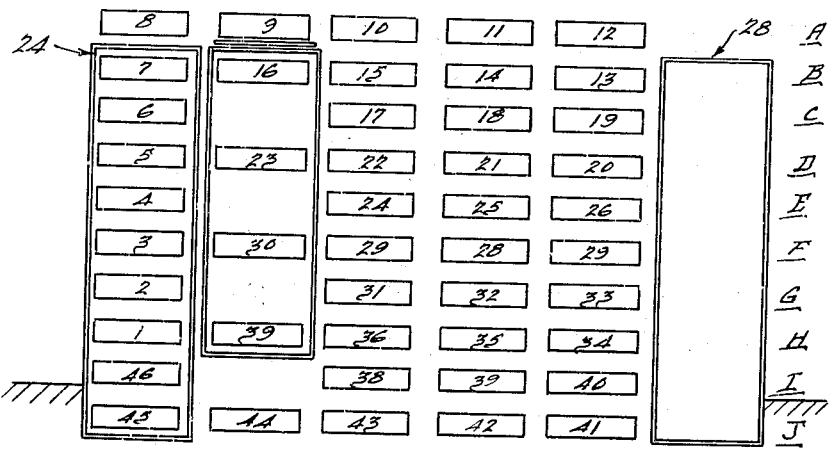
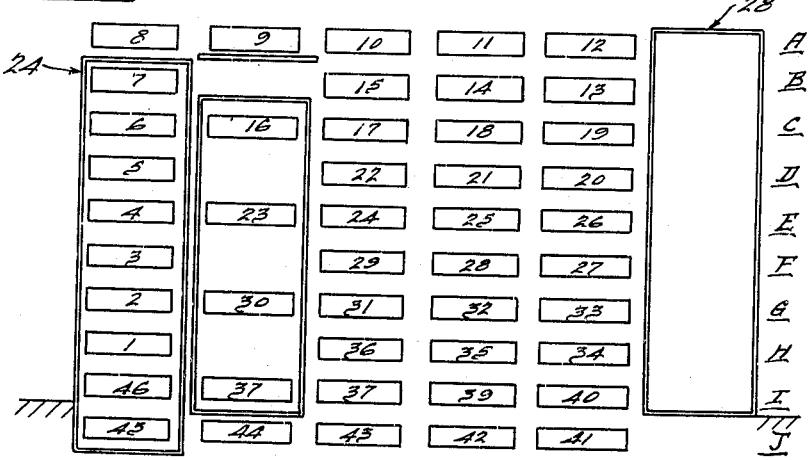
INVENTOR.
Preston E. Marshall
BY
Charles R. McKinley
ATTORNEY

UNITED STATES PATENT OFFICE 2,864,515
Patented Dec. 16, 1958

2,864,515

AUTOMOBILE PARKING APPARATUS

Preston E. Marshall, Wayne, Mich., assignor of one-half to John R. McKinley, Grosse Pointe Shores, Mich.

Application April 19, 1954, Serial No. 424,157

8 Claims. (Cl. 214—16.1)

This invention relates to automobile parking apparatus.

The problem of providing adequate parking facilities in congested areas has existed for many years, and many large cities now require new business establishments to provide off-street parking facilities for their customers. In addition to the fact that there is not enough vacant land available in congested areas to solve this problem with the use of conventional parking lots, the high cost of such property makes it uneconomical to use the vacant land that is available for surface parking facilities. Ramp garages have come into widespread use in recent years, and while such garages make possible a more efficient use of land than surface parking lots in that they can park more cars in a given area than is possible with surface parking, the cost of ramp garages is very high, and they are inefficient in that a great amount of the available floor space must be devoted to ramps and aisles leading to the parking stalls. Moreover ramp garages are limited as to the number of floors, usually 4 or 5, and require a large number of attendants to handle the cars, resulting in high labor costs and uneconomical operation.

It is becoming increasingly apparent that the solution to the parking problem lies in the development of so-called vertical parking, i. e., a mechanical apparatus capable of stacking cars vertically so that the number of square feet of surface area required per car parked is at a minimum. Mechanical garages of various types, both fully automatic and semi-automatic, have been proposed, and a few such devices have been built. Some of the mechanical garages heretofore proposed may have represented an advance over surface parking and ramp garages in some respects, but have not been adopted on a large scale because of disadvantages such as too high cost per car space available, too much space within the building taken up by elevators or other operating mechanism and not utilized as storage space, mechanical failures and high maintenance costs, or because the apparatus cannot be loaded or unloaded in a sufficiently short time during rush hours. Automatic or semi-automatic garages heretofore put into use have generally consisted of a multiple storied building having a number of fixed storage spaces at each level and an elevator adapted to handle each car individually to move the car to and from a storge space. In some cases the cars are driven onto and off of the elevator by an attendant, and in other cases an automatically operated device is employed to move the cars to and from the elevator. In garages of this type cars cannot be loaded and unloaded at the same time because a single elevator is used for both loading and unloading.

The present invention is directed to a parking apparatus adapted for automatic operation which operates on a very different principal than those devices which have previously been suggested. The apparatus comprises a plurality of individual parking decks, each adapted to support a car to be parked, and power operated mechanism for moving the decks through the building in a fixed sequence along a continuous path. The cycle of operation of the apparatus is such that each deck is advanced one position along such path during each cycle of operation. The building is provided with an entrance at one end and an exit at its opposite end, and the decks are moved in sequenc past the entrance and exit during continued operations of the apparatus. The cycle of operation preferably is such that when the apparatus is at rest, a parking deck is aligned with the entrance so that a car to be parked may be driven onto such deck. When the apparatus is now operated for one cycle, each deck will be advanced one position so that the succeeding deck will be positioned at the entrance to receive another car. Similarly, a car may be driven off of the deck aligned with the exit when the apparatus is at rest, and during the next cycle of operation such deck will be advanced one position toward the entrance while the succeeding deck will be positioned at the exit. The apparatus is adapted for control by a single attendant, except for the operation of driving cars onto and off of the parking decks at the entrance and exit of the building. The decks are numbered in sequence, and suitable control panels are provided having operating buttons numbered to correspond with the numbers on the decks. After the customer drives onto an empty parking deck, he is given a ticket having a number corresponding to the number of that deck, and the apparatus may then be operated for one cycle of operation to advance each deck one position thereby placing the succeeding deck at the entrance. When the customer returns for his car, the claim check is presented to the attendant who actuates a control button corresponding to the number on the check, and the apparatus goes through successive cycles of operation, each cycle advancing the desired deck and all other decks one position, until the desired deck reaches the exit, at which time the apparatus is automatically stopped to enable the customer or an attendant to drive the car off of the deck. The control panels will indicate to the operator the number of the deck at the entrance and will indicate which of the decks are loaded and which are empty, so that if the deck at the entrance is loaded and a customer desires to park, a control button corresponding to the empty deck closest to the entrance is actuated and the apparatus will re-cycle until that deck reaches the entrance.

More specifically, the apparatus comprises a building having a plurality of superposed levels of track elements along which the decks are movable in sequence, power operated means to shift the decks on adjacent levels in opposite directions during each cycle of operation, power operated transfer means at opposite ends of the several levels to lower a deck from one level to the next lower level during each cycle of operation, and an elevator adapted to receive decks from the lowest level and to elevate each of the decks in the elevator one level to position one of such decks at the top level during each cycle of operation, thereby providing a continuous path through the building along which the decks move in a fixed sequence. As the description of the invention proceeds, it will be seen that a system of this type utilizes a large percentage of the available space in the building for actual storage of cars, thus requiring only a few square feet of surface area per car space available, and may be loaded and unloaded very rapidly during rush hour operation. The building need be only about 10 feet in width, and may be made as deep as desired to enable its use on nearly any size lot which might be available. The number of stories may be increased or decreased, in multiples of two, so that the capacity of each unit may be varied as desired. Moreover any number of individual units may be disposed side by side on a single lot, each unit operating independently of the others, to provide a total capacity for several hundred cars. Due to the fact that each unit is operated individually, a large number of cars may be parked or de-parked at the same time.

The principal object of the present invention is to provide an improved automobile parking apparatus.

Another object of the invention is to provide a mechanical parking apparatus in which the parked cars are movable through the building in a fixed sequence during operation of the apparatus.

Another object of the invention is to provide an apparatus of the type described in which each car is adapted to be supported on an individual parking deck, the several decks being movable in a fixed sequence along a continuous path.

A further object of the invention is to provide an automobile parking apparatus including a plurality of individual parking decks and a power operated means for moving the decks in a fixed sequence in such manner that each individual deck is advanced one position during each cycle of operation of the apparatus.

A further object of the invention is to provide a mechanical parking device in which individual parking decks are moved in sequence past an entrance to and an exit from the apparatus.

Another object of the invention is to provide a parking apparatus consisting of a series of independently operated units each having an entrance at one end and an exit at the other end thereof.

Other and further objects of the invention will be apparent from the following description and claims and may be understood by reference to the accompanying drawings, of which there are seven sheets, which by way of illustration show a preferred embodiment of the invention and what I now consider to be the best mode in which I have contemplated applying the principles of my invention. Other embodiments of the invention may be used without departing from the scope of the present invention as set forth in the appended claims.

In the drawings:

Fig. 1 is a somewhat schematic vertical sectional view through a parking apparatus constructed according to the principles of this invention;

Fig. 2 is a horizontal sectional view taken on line 2—2 of Fig. 1;

Fig. 3 is a fragmentary vertical sectional view through the elevator mechanism and taken on line 3—3 of Fig. 1;

Fig. 4 is a fragmentary sectional view taken on line 4—4 of Fig. 1;

Fig. 5 is a fragmentary sectional view taken on line 5—5 of Fig. 1;

Fig. 6 is a fragmentary top plan view of one of the parking decks and showing the same coupled to similar decks aligned therewith;

Fig. 7 is a vertical sectional view through a pair of decks coupled together and taken on line 7—7 of Fig. 6;

Fig. 8 is a fragmentary side elevational view of a part of the rack and pinion mechanism providing for horizontal shifting of the parking decks;

Fig. 9 is a vertical sectional view through the rack and pinion drive mechanism shown in Fig. 8;

Figure 11:
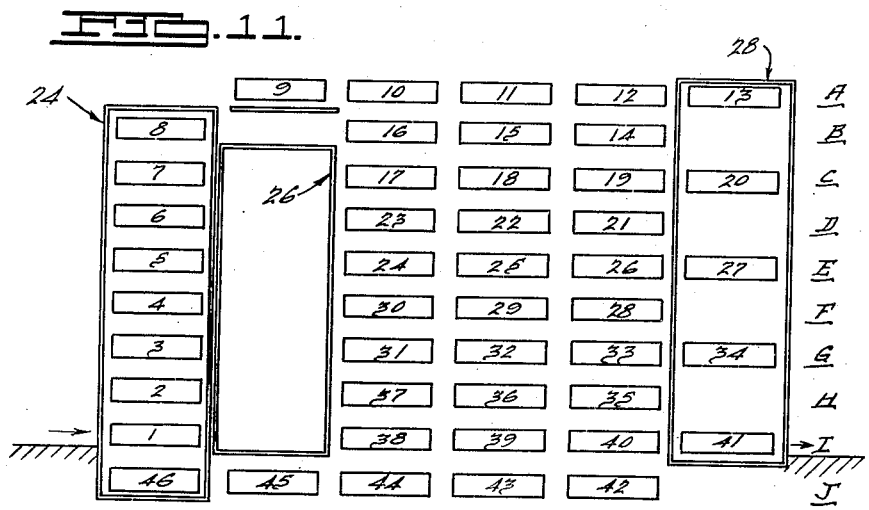

Fig. 10 is a fragmentary side elevational view of a power operated means for actuating the horizontal shifting mechanism shown in Figs. 8 and 9; and Figs. 11–14 are diagrammatic side elevational views of the apparatus showing the several movements of the power operated mechanisms which make up one complete cycle of operation of the apparatus; and Fig. 15 is a fragmentary view of the lower level of the elevator, showing a modified construction thereof.

The apparatus schematically illustrated in Fig. 1 of the drawings includes a structural steel framework defining a long narrow building structure within which cars may be parked on a plurality of superposed storage levels numbered from 1 to 8 consecutively beginning with the top level. The framework of the building includes vertical girders 10 at the sides of the building and horizontally disposed vertically spaced frame members 12 and 14 extending between the vertical girders 10 at the sides and ends of the building. The building is provided with a fixed track means 16 at each of the levels 1–8, and such track means extend longitudinally of the building and are disposed in an intermediate portion thereof. Each track means 16 comprises a pair of spaced parallel rails or tracks 18 resting upon longitudinally extending I-beams 20 which are supported by beams 22 extending horizontally across the building and secured at their ends to the vertical girders 10. An elevator mechanism 24 is located at one end of the building, and vertically reciprocable transfer means 26 and 28 are disposed at opposite ends of the track elements 16.

The transfer means 28 comprises a suitable structural steel framework including vertically extending beams 30 at each of the four corners thereof and spaced horizontally disposed frame members 32 secured to the vertical beams 30. The transfer means 28 is provided with fixed track elements 34 at alternate levels thereof. The track elements 34 comprise spaced parallel rails 36 resting upon longitudinally extending I-beams 38 which are supported by transverse beams 40 secured at their ends to the vertical beams 30. The transfer means 28 is shown in its raised position in Fig. 1, from which it will be seen that the several track means 34 therein are aligned with the track means 16 at levels 1, 3, 5, and 7 of the building.

The transfer means 26 is similar in construction to the transfer mechanism 28 already described and is adapted to support a plurality of track means 36 on alternate levels thereof. The track means 36 may be similar in construction to the tracks 34 supported by the transfer means 28. The transfer mechanism 26 is shown in its lowered position in Fig. 1 in which position the several track elements 36 are aligned with the track elements 16 on levels 3, 5, and 7 of the building. The spaced rails 18 at the top level 1 are extended through the framework defining the transfer mechanism 26, and the extended portion 38 of such tracks is supported at its outer end on a frame member 40 of the building. The tracks 18 on the lower level 8 are extended as at 42 beneath the transfer mechanism 26. When the transfer mechanisms 26 and 28 are in the position shown in Fig. 1, the track means 34 and 36 carried thereby are aligned with and terminate closely adjacent to ends of the rails 18 which are fixedly supported within the building as described. When the transfer mechanism 26 is elevated, the rails 36 thereof will then be aligned with the tracks 18 on levels 2, 4, and 6, and when the transfer mechanism 28 is lowered, the tracks 34 thereof will then be aligned with the tracks 18 on levels 2, 4, 6 and 8 of the building. The transfer devices 26 and 28 are guided in their vertical movements by vertically extending guide elements 41 and 43 (see Fig. 2) secured to the framework of the building and to the framework of the transfer devices at the sides thereof, respectively.

A plurality of individual parking decks 44 are supported upon and movable along the tracks 18 in end to end relation and are also adapted to be supported on the tracks 34 and 36 in the two transfer mechanisms. The construction of the parking decks is shown in Figs. 6 and 7 from which it will be seen that each deck comprises a rectangular frame having a top deck 46 and suitable side and end frame members 48 and suitable cross braces to provide a sufficiently strong and rigid construction. Each parking deck 44 is adapted to support a car thereon, and sheet metal guides 50 extend along opposite sides of the decks 44 for guiding the wheels of the vehicle as it is moved onto and off of the deck. The decks may be provided with suitable depressions or wheel wells on the top surface thereof to properly position the cars on the decks. Each deck is provided with wheels 52 journalled on axles 54 which extend between opposite sides of the decks at both ends thereof. The wheels 52 are provided with flanges 56 adapted to ride against the sides of the various track elements so as to insure the proper alignment of the several parking decks 44. Each deck 44 is provided with a coupling means at both ends thereof. The coupling means are of two types, male and female, and each deck is provided with the same type of coupling means at both ends. As shown in Figs. 6 and 7, the male coupling members comprise T-shaped coupling elements 58 secured to the end frame members of the deck on the longitudinal center line thereof. The coupling elements 58 are adapted to be received within the coupling elements 60 secured on the end frame members of adjacent decks for coupling the several aligned decks together for movement together along the supporting rails. The coupling elements 60 are substantially C-shaped as shown in Fig. 6, and the head 62 of the T-shaped coupling element 58 is adapted to be received within the vertically disposed slot 64 which extends through the coupling element 60. It will be seen that when the two adjacent decks are spaced apart the proper distance as shown in Fig. 6, relative vertical movement between such decks will uncouple the same, and similarly when one of the decks is disposed above the other but in the proper longitudinal spacing, subsequent relative vertical movement between such decks will result in interlocking of the coupling elements 58 and 60.

The elevator mechanism 24 comprises a steel framework including vertically disposed beams 66 at each of the four corners thereof and suitable cross bracing elements to provide a rigid cage-like framework. The elevator 24 is shown in its lowered position in Fig. 1 and is adapted to be raised and lowered by a suitable power operated means 68 adapted to drive a drum or pulley 70 in either direction. A series of cables 72 are driven by pulley 70 and are secured to the upper end of the elevator 24 at one end thereof and may have a suitable counterweight secured to their other ends for counterbalancing the weight of the elevator. As illustrated in Fig. 1, the power operated means 68 comprises an electric motor 74 and a speed reduction unit 76 having an output shaft 78 on which the drive pulley 70 is secured. It will be apparent that a suitable hydraulic or other power means might be substituted for the electric motor drive illustrated.

The elevator 24 is guided in its movement within the framework of the building by suitable vertical guide elements 80 and 82 secured to the framework of the building and the elevator respectively at opposite ends of the elevator mechanism. The elevator is adapted to support a parking deck 44 therein at each of the levels 1-8. The deck 44 at the lower level of the elevator is adapted to be supported on tracks 84 which are secured to the elevator framework. When the apparatus is at rest as shown in Fig. 1, the parking decks 44 within the elevator are supported on suspension dogs 86 which are pivoted on shafts 88 secured at their ends to certain of the vertical girders 10 of the building. The shafts 88 extend horizontally between the vertical beams 10 longitudinally of the building on levels 1-7 of the building. Two of the suspension dogs 86 are pivotally mounted on each of the shafts 88, and as shown in Fig. 3, the side frame members of the parking decks 44 rest upon the upper surfaces 90 of the suspension dogs 86 so that when the elevator is in its lowered position, the decks 44 therein are supported on the framework of the buildings by means of the suspension dogs 86. The suspension dogs 86 are prevented from pivoting downwardly from the position shown in Fig. 3 by suitable bars 92 secured to the vertical beams 10, the dogs 86 having lugs 94 engaging the stops 92 in this position of the dogs to prevent such pivotal movement. At the top level of the elevator, roller supporting members 96 are pivotally journalled on the shafts 88 rather than two of the suspension dogs 86 as on the lower levels of the elevator.

The supporting members 96 have a plurality of rollers 98 rotatably journalled on pins 100 secured to brackets 102 mounted on the upper surface 104 of the members 96. The side frame members of the decks 44 are adapted to rest upon the rollers 98 so as to enable a deck supported on the rollers to be shifted therefrom onto the extended track portion 38 during operation of the apparatus. Pivotal movement of supporting members 96 is limited by stops 106 secured to the framework of the building.

The elevator framework is provided with lift dogs 108 at each side thereof, and the lift dogs 108 are journalled on shafts 110 secured at their ends to the framework of the elevator as shown in Figs. 1 and 2. Pivotal movement of the lift dogs 108 downwardly is limited by stops 112 secured to the elevator framework. When the elevator is in its lowered position, the lift dogs are disposed a slight distance below the suspension dogs 86 on which the decks 44 within the elevator are supported. When the elevator is raised, the lift dogs 108 will engage the underside of the side frame members of the several parking decks and lift such decks off of the suspension dogs 86. The vertical movement of the elevator is slightly greater than the vertical distance between the supporting surfaces 90 of the supporting dogs on adjacent levels. At level No. 2, the lift dogs 108 are adapted to engage the ends of the deck rather than the sides thereof as on levels 3–7, so as not to interfere with the roller supports 96.

From Fig. 3 it will be seen that as the lower parking deck illustrated in Fig. 3 is raised on lift dogs 108, the sides of the deck will engage the undersides 114 of the suspension dogs 86 at the next higher level, and further elevation of the deck will pivot the suspension dogs upwardly to permit the deck to be elevated above the same. Since the deck is elevated sufficiently to clear the suspension dogs 86, the latter will then be free to pivot downwardly until they engage stops 92, which is their load supporting position. The elevator is then lowered a slight distance to lower the deck onto the suspension dogs and to disengage the lift dogs 108 from the deck. The deck 44 on the second level of the elevator will be positioned on the supporting rollers 98 in a similar manner, and it will be seen that one cycle of operation of the elevator will elevate each deck therein one level and position one deck on the top level on the rollers 98. As the elevator continues its downward movement, the lift dogs 108 will engage the sides of the decks 44 and be pivoted upwardly so as to permit them to pass below such decks into position for subsequently elevating the decks upon the next cycle of operation of the elevator. Suitable spring means (not shown) may be provided for returning the dogs 86 and 108 to their load supporting positions.

As shown in Fig. 1, the deck which is supported at the lower level of the elevator is coupled to the deck supported on fixed track portion 42, and when so arranged, the deck within the elevator is not vertically aligned with the remainder of the decks supported within the elevator. Cam members 116 are secured to the framework of the building and are disposed above the end of the deck supported within the elevator at the lower level 8. When such deck is raised by the elevator, the end frame member of the deck at opposite sides thereof will engage the cam members 116 which will force the deck to roll along the track 84 in the elevator until such deck is aligned vertically with the remainder of the decks in the elevator. The deck should be given a sufficient amount of travel to permit the same to be uncoupled from the adjacent deck on the track 42 before engaging cam members 116. Similar cam members 118 are provided at the top level of the elevator for causing the deck being elevated onto the rollers 98 to shift longitudinally an amount sufficient to permit the coupling member on such deck to interfit with the coupling member on the deck supported on the track section 38.

A power operated means is provided for shifting all of the decks along the various track elements, and such means are shown in Figs. 8, 9, and 10. At each of the building levels 1–8 a shaft 120 is journalled at its opposite ends in a suitable portion of the framework of the building. The shafts 120 extend transversely across the building below the fixed track means 16. The construction of the horizontal drive mechanism is the same at each of the levels, and accordingly only one of such mechanisms will be described. A pinion 122 is secured on shaft 120 on the longitudinal center line of the building, and the teeth of the pinion gear 122 are meshed with teeth 124 formed on a longitudinally extending rack 126 which is slidably mounted within suitable guides 128 secured on cross frame members 130 of the building. A bracket 132 is pivotally mounted on one end of the rack 126. The bracket 132 is prevented from pivotal movement in a clockwise direction from the position in which it is shown in Fig. 8 by its engagement with the rack 126, and a spring 134 connected between the rack 126 and bracket 132 urges the bracket in such direction. The bracket is provided with an upwardly projecting end 136 adapted to engage the end wall of one of the parking decks 44 so that when the rack 126 is shifted to the left, Fig. 8, the bracket 132 will react against the end wall of such parking deck and shift it and all of the other decks coupled together on that level of the apparatus along the track elements. The cycle of operation of the apparatus is such that each deck is advanced one position along the track elements during each operation of the rack. It will be seen that when the rack is shifted in the opposite direction, the upwardly projecting end 136 of the bracket 132 will engage the opposite end of the adjacent deck and will be pivoted thereby in a counterclockwise direction so as to permit the bracket to pass beneath the deck without moving the deck along the tracks. The return movement of the rack is sufficient to enable the bracket 132 to clear the end of the deck which it is to engage during the next cycle of operation to permit the bracket to return to its driving position shown in Fig. 8 under the influence of spring 134.

One end of the shaft 120 projects beyond the side frame member of the building in which it is journalled, and a pinion gear 138 is secured on the outer end of shaft 120. A suitable outboard bearing 139 may be provided for the outer end of shaft 120. The teeth of the pinion gear 138 are meshed with the teeth 140 formed on a rack 142 extending downwardly along one side of the apparatus so that the teeth 140 thereof will be meshed with the pinion gears 138 at each of the levels 1–8. A cable 144 is secured to the upper end of the rack 142 and is trained over pulleys 146 and 148 and has a counterweight 150 secured to its other end for counterbalancing the weight of the rack. The drive pulley 146 may be driven by a suitable electric motor 152 through a speed reduction unit 154. A hydraulic power means obviously may be substituted for the electric motor drive for the rack illustrated and described. It will be seen that when the rack is driven downwardly, the shafts 120 and pinions 122 will be driven in one direction to effect shifting of the racks 126 in one direction, and that subsequent elevation of the rack 142 will reverse the direction of movement of the racks 126. Thus during each cycle of operation of the apparatus, the rack 142 is raised and lowered an extent sufficient to advance each deck one position through the apparatus. The decks on levels 1, 3, 5, and 7 are shifted to the right as viewed in Fig. 1, while the decks on levels 2, 4, 6, and 8 are shifted to the left as viewed in Fig. 1. Therefore, the brackets 132 which engage the ends of the decks to shift the same are located at the left-hand ends of the racks 126 on levels 1, 3, 5, and 7 and at the right-hand ends of the racks 126 on levels 2, 4, 6, and 8. When the electric motor 152 is operated to elevate the rack 142, all of the racks 126 will be shifted in the same direction at the same time, but only the brackets on every other level will drivingly engage certain of the parking decks so that only the decks on such levels will be shifted upon elevation of the rack 142. The brackets 132 on the remaining levels will at such time be pivoted as they engage the decks so as to pass beneath such decks to be returned to their driving position. Similarly when the rack 142 is subsequently lowered, all of the racks 126 will be shifted in the opposite direction, but only the decks on the remaining alternate levels will be moved along the track elements.

The transfer means 26 and 28 may be driven by means of an electric motor 160 through a speed reduction unit 162. A pulley 164 is secured on the output shaft 166 of the speed reduction unit, and a cable 168 is wound on the drive pulley 164 and at one end passes over an idler pulley 170 and is secured to the transfer mechanism 26. The other end of the cable 168 passes over an idler pulley 172 mounted on a bracket 174 and is secured to the transfer mechanism 28. It will be seen that the transfer mechanisms 26 and 28 operate together and move in opposite directions, that is, one is elevated while the other is being lowered. The electric motor drive for the transfer means 26 and 28 may be replaced by suitable hydraulic power means if desired.

The building is provided with an entrance 176 at one end thereof through which cars to be parked may be driven onto an empty parking deck 44 between cycles of operation of the apparatus. An exit 178 is provided at the opposite end of the building through which may be driven the car on the parking deck at the lower level of the transfer means 28. As shown in Fig. 1, the lower level 8 is disposed below ground while the remaining levels are above ground. It will be apparent that the entrance and exit may be provided at any level of the building and that all of the levels 1–8 may be disposed entirely above ground or below ground.

Figs. 11–14 schematically illustrate the several operations which take place during one complete cycle of operation of the apparatus to advance each deck one position through the apparatus. In Figs. 11–14 the apparatus is designed for 10 stories in height, identified by reference characters A–J beginning with the top level, and the depth of the building is sufficient to accommodate six of the parking decks disposed in end to end relation. Each of the decks, either loaded or unloaded, are represented by one of the rectangles which are numbered consecutively from 1–46, deck No. 1 being positioned at the entrance. The apparatus is shown in Fig. 11 in its starting position in which the elevator 24 is in its lowered position and is supplied with decks on levels B–J. The transfer means 26 is in its lowered position and is empty while the transfer means 28 is in its raised position and is loaded with decks on A, C, E, G, and I levels. The decks are coupled together on all of the several fixed track elements. In this position of the apparatus, a car may be driven onto deck No. 1 if the same is empty, and a car may be driven off of deck No. 41.

Figure 12:
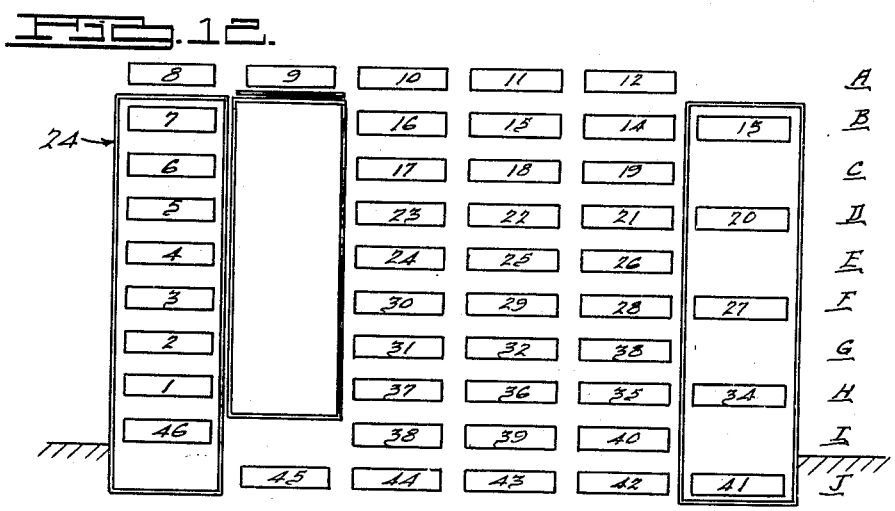

As soon as the apparatus is started into operation, the elevator 24 is raised to elevate each deck therein one level and to position deck No. 8 on the roller supporting member 96 which is at the A level. The transfer means 26 and 28 also begin movement at this time, and the transfer means 26 is raised so that the tracks therein are aligned with the decks on the B, D, F, and H levels. The transfer mechanism 28 is lowered to move the decks therein down to the B, D, F, H and J levels as shown in Fig. 12.

As soon as the elevator 24 has returned to its lowered position, the motor 152 is energized to lower the rack 142 and thereby effect horizontal shifting of all of the rack members 126 toward the front end of the building. Such operation of the rack members 126 shifts all of the decks on the B, D, F, H and J levels one position toward the front end of the building so as to unload the transfer means 28 and load the other transfer means 26 on the B, D, F, and H levels, such operation also shifting deck 45 into the elevator 24 at the lower level thereof. This operation is shown in Fig. 13.

As soon as the racks 126 have completed movement of the decks toward the front of the building, the motor 152 is de-energized and motor 160 is energized to lower the transfer device 26 and raise the other transfer device 28 as shown in Fig. 14, whereupon motor 160 is de-energized and motor 152 energized to elevate rack 142, thereby driving all of the racks 126 toward the rear of the building to shift the decks on the A, C, E, G, and I levels, including those in the transfer device 26, one position toward the rear of the building to unload the front transfer device 26 and load the transfer device 28 with decks on the A, C, E, G, and I levels. This completes one cycle of operation, and the apparatus is now in the starting position shown in Fig. 11. Each deck has been advanced one position along the continuous path through the apparatus in the fixed sequence in which the decks are arranged. Deck No. 46 is now at the entrance in position to receive a car to be parked, and deck No. 40 is at the exit so that a car may be driven therefrom through the exit.

Suitable electrical circuits including limit switches (not shown) are provided for energizing and de-energizing the various electric motors at the proper times during the cycle of operation. Each deck is provided with contactor buttons 180 at opposite ends thereof which are adapted to engage one of a series of switch actuating buttons disposed on a switch plate (not shown) suitably located at both the exit and the entrance to the apparatus. The switch plates have a number of switch actuating buttons thereon corresponding to the number of decks within the apparatus, and the contactor buttons 180 on the end walls of each deck are disposed in a different location than the contactor buttons 180 on the remainder of the decks so that the buttons 180 on each deck can engage only one of the switch actuating buttons. As previously described, when a particular deck is desired at the exit, the attendant actuates a button on the control panel corresponding to the number of that deck, and the apparatus will continue cycling until the desired deck reaches the exit. The contactor buttons 180 are provided for stopping operation of the apparatus when the desired deck reaches the exit. The electrical circuits controlling the apparatus are such that the circuit providing for automatic re-cycling is held in through a switch controlled by the button on the switch plate located at the exit corresponding to the number of the deck which has been called for at the exit. This switch will remain closed until its actuating button is engaged by the contactor button 180 on that particular deck, at which time the circuit will be broken and the apparatus will be stopped. None of the contactor buttons 180 on the other decks can engage this particular actuating button to open the switch because the contactor buttons on all of the decks are located in different positions on the end walls of the decks. When a particular deck is called for at the entrance, the operation is similar and the apparatus will continue cycling until the contactor button on the selected deck engages the corresponding switch operating button located on the switch plate at the entrance.

It will be apparent that a somewhat different cycle of operation than that described in connection with Figs. 11-14 may be employed, although the sequence in which the transfer mechanisms and racks 126 operate will be the same. In other words, the starting position of the apparatus need not be as shown in Fig. 11. For example, the entrance and exit may be disposed at the lowest level of the apparatus, or the entrance and exit may be disposed at different levels so that a different starting position and operating cycle would be employed.

In the elevator construction disclosed in Fig. 15, the fixed tracks 18 are extended through the lower end of the elevator, and the decks are shifted onto such extended portion of the fixed tracks 18 rather than onto the track section 84 which is movable with the elevator in the construction shown in Fig. 1. In this modification the elevator 24 at the lower end thereof is provided with a plurality of pivoted lift dogs 208 journalled on shafts 210 supported by blocks 212 fixed on the elevator framework. Each of the lift dogs 208 is provided with a roller 214 rotatably supported thereon. When the elevator is in its lowered position, the lift dogs 208 are disposed a short distance below the underside of the parking deck 44 so that the deck may roll along the fixed tracks 18 during operation of the horizontal shifting mechanism as previously described. When the elevator is raised, the deck will be lifted off of the fixed track elements 18 on rollers 214, and the deck will roll on such rollers as the deck engages the cam members 116 to obtain proper vertical alignment of the deck. When the elevator is lowered, the lift dogs 208 are pivoted upwardly as they engage the deck positioned on the fixed tracks 18 at the lower level of the elevator so as to pass beneath such deck and return to their load supporting position. The lift dogs 208 are similar in construction and operation to the lift dogs 108 described in connection with Fig. 1, except for the rollers 214 which permit horizontal shifting of the deck when the elevator is raised.

When the modified construction of the elevator shown in Fig. 15 is employed, it will be possible to initiate shifting of the decks toward the front of the building prior to the time that the elevator completes its cycle of operation. With this arrangement the time required to complete one cycle of operation will be shorter, and such construction might be employed when the cycle of operation is as disclosed and described in Figs. 11-14 as well as in installations in which the starting position of the apparatus might be somewhat different, such for example as when the exit is located at the lowest level and the rear transfer device 28 is in its lowered position when the apparatus completes a cycle of operation.

The height of the building may be increased as desired, but the number of stories must be increased by two, or multiples of two, in order to maintain a closed path through the apparatus. The depth of the building may be increased as desired to accommodate any number of decks in end to end relation on the fixed track elements in the intermediate portion of the building. Any increase in either of the depth or height of the building results in a decrease in the number of square feet of surface area required per car space available within the apparatus.

A car may be driven onto the parking deck at the entrance to the apparatus at the same time a car is being de-parked at the exit, thus resulting in speedier operation than is possible with apparatus of the type in which a single elevator or other device is employed for both loading and unloading each car individually. Since an individual unit is only approximately 10' in width, a great number of such units may be disposed side by side on one lot; and since each unit operates independently of the others, a number of cars may be loaded and unloaded at the same time.

In the parking system described herein, none of the operating mechanisms need move, either vertically or horizontally, more than a few feet at one time so that each individual operation during a complete cycle requires only a very few seconds, resulting in a complete cycle of operation which is very rapid.

It will be seen that the building structure is relatively simple and consists entirely of structural steel framework, resulting in a low cost per car space available within the apparatus. The system described herein is useful in applications other than as an automobile parking apparatus, such as in warehouses, in factories as a parts handling or conveying system, and in other commercial or industrial installations which will be apparent to those skilled in the art.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. Automobile parking apparatus comprising stationary means defining at least four superposed levels of track elements, a plurality of parking decks movable along said track elements, power operated means for moving said decks in sequence along successive levels in opposite directions, said power operated means including a horizontally reciprocable rack at each of said levels engageable with one of the decks on the track elements of such level, the racks on alternate levels being operable to shift the decks on such levels in one direction and the racks on the remaining levels being operable to shift the decks on the remaining levels in the opposite direction, and a single motor-driven means for actuating all of said racks in the same direction at each operation of said motor-driven means, transfer means for lowering decks from the ends of said levels to the next lower levels, and power operated means adapted to receive decks from the lowermost level and to elevate such decks to the top level to provide a continuous path along which said decks are movable in a fixed sequence.

2. Automobile parking apparatus comprising a building structure, a plurality of individual parking decks movable within said building along a predetermined path and in a fixed sequence, and means for supporting and moving said decks in said fixed sequence along said path, comprising stationary means in said building defining a plurality of superposed track elements defining a part of said path, power operated means for moving the decks along successive track elements in opposite directions, said power operated means including a drive shaft extending transversely of the track elements at each of said levels, a pinion on each drive shaft and a rack meshed with each pinion and engageable with one of the decks in one direction of movement thereof, and a single vertically reciprocable motor-driven rack meshed with each pinion, transfer means at opposite ends of the track to the next lower track, and a vertically reciprocable elevator adapted to support a plurality of decks therein, said elevator being adapted to receive decks from the lowermost level and to elevate all of the decks therein one level during each operation thereof to position one of such decks at the top level.

3. Automobile parking apparatus comprising a building structure having a plurality of superposed levels of track elements extending longitudinally of the building, a plurality of individual parking decks movable along said levels in a fixed sequence in end to end relation, power operated means for advancing each deck one position during each cycle of operation of said apparatus comprising a vertically reciprocable transfer means at opposite ends of said levels for lowering a deck from each level to the next lower level during said cycle of operation, means for shifting the decks on alternate levels including the top level in one direction between movements of and in one position of said transfer means to load one of said transfer means with decks to be lowered and unload lowered decks from the other transfer means, and for shifting the decks on the remaining levels in the opposite direction between movements of and in the other position of said transfer means to unload said one transfer means and load the other, said shifting means comprising a rack at each of said levels engageable with one of the decks on the track elements of such level and a single motor-driven means for reciprocating said racks in unison, and a vertically reciprocable elevator adapted to support a plurality of decks and to elevate each deck therein one level to position one such deck at the top level during each said cycle of operation, said elevator being adapted to receive decks from the lowermost level during operation of said shifting means in said opposite direction to provide a continuous path through said building along which said decks are movable in sequence.

4. Automobile parking apparatus comprising a building structure having stationary means defining a plurality of superposed levels of track elements extending longitudinally of the building, a plurality of individual parking decks movable along said levels in end to end relation, power operated vertically reciprocable transfer means at opposite ends of said levels, power operated means for shifting the decks on alternate levels including the top level in one direction between movements of and in one position of said transfer means to load one of said transfer means with decks to be lowered and unload lowered decks from the other transfer means, and for shifting the decks on the remaining levels in the opposite direction between movements of and in the other position of said transfer means to unload said one transfer means and load the other, said power operated means including a horizontally reciprocable rack at each level engageable with one of the decks on such level and a motor operated means for reciprocating said racks, said transfer means being operable between movements of said shifting means to lower the decks therein to the next lower level, and a vertically reciprocable elevator adapted to receive decks from the lowermost level during operation of said shifting means in said opposite direction and to elevate such decks to said top level to provide a continuous path through said building along which said decks are movable in a fixed sequence.

5. Automobile parking apparatus comprising a building structure having stationary means defining a plurality of superposed levels of track elements extending longitudinally of the building, a plurality of individual parking decks disposed in end to end relation on each of said levels, a vertically reciprocable transfer means at the rear end of said building and operable during each cycle of operation of said apparatus to receive decks from the adjacent ends of alternate ones of said levels, including the top level, and to lower such decks to the next lower levels, vertically reciprocable transfer means toward the front of said building and operable during each said cycle of operation to receive decks from the adjacent ends of the remaining levels except the lowest level, and to lower such decks to the next lower levels, power operated means including a drive shaft extending transversely of the track elements at each level and a single motor-driven means for actuating said drive shafts for shifting the decks on adjacent levels in opposite directions during said cycle of operation, and a vertically reciprocable elevator at the front of said building immediately in front of said front transfer means and adapted to support a plurality of decks and to elevate each deck therein one level to position one such deck at the top level during each said cycle of operation, said elevator being adapted to receive decks from the lowermost level to provide a continuous path through said building along which said decks are movable in a fixed sequence.

6. Automobile parking apparatus comprising stationary means defining a plurality of superposed storage levels each adapted to support a plurality of vehicles thereon, a vertically reciprocable transfer means operable during each cycle of operation of said apparatus to receive vehicles from the ends of said levels and to lower such vehicles to the next lower levels, power operated means for shifting the vehicles on adjacent levels in opposite directions during said cycle of operation, said power operated means including a drive shaft at each of said levels and a single motor operated device for operating said drive shafts, and a vertically reciprocable elevator adapted to support a plurality of vehicles and to elevate each vehicle therein one level and to position one such vehicle at the top level during each said cycle of operation, said elevator being adapted to receive vehicles from the lowermost level to provide a continuous path along which said vehicles are movable in a fixed sequence.

7. Storage apparatus comprising a building structure having stationary means defining a plurality of storage levels, a plurality of article supporting decks disposed on each of said levels, vertically reciprocable transfer means at opposite ends of said levels and operable during each cycle of operation of said apparatus to receive decks from the adjacent ends of said levels and to lower such decks to the next lower levels, power operated means for shifting the decks on every other level in one direction and the decks on the remaining levels in the opposite direction during said cycle of operation, said power operated means including a rack at each level engageable with one of the decks on such level and a single motor-driven means for actuating said racks, and a vertically reciprocable elevator adapted to support a plurality of decks and to elevate each deck therein one level to position one such deck at the top level during each said cycle of operation, said elevator being adapted to receive decks from the lowermost level to provide a continuous path through said building along which said decks are movable in a fixed sequence.

8. Apparatus according to claim 7 wherein said decks are provided with coupling means at opposite ends thereof for coupling decks on the same level together for movement by said shifting means, said coupling means being automatically engaged and released upon relative vertical movement of adjacent decks in said sequence.

References Cited in the file of this patent

UNITED STATES PATENTS

| | | |
|---|---|---|
| 1,115,248 | Schier | Oct. 27, 1914 |
| 1,422,816 | Beers et al. | July 18, 1922 |
| 1,577,589 | Rapp | Mar. 23, 1926 |
| 1,881,063 | Randolph | Oct. 4, 1932 |
| 2,186,854 | Auger et al. | Jan. 9, 1940 |
| 2,569,393 | Walker | Sept. 25, 1951 |
| 2,711,616 | Weller et al. | June 28, 1955 |

UNITED STATES PATENT OFFICE
CERTIFICATE OF CORRECTION

Patent No. 2,864,515                                    December 16, 1958

Preston E. Marshall

It is hereby certified that error appears in the printed specification of the above numbered patent requiring correction and that the said Letters Patent should read as corrected below.

Column 11, line 43, after "track" insert -- elements for lowering decks from the end of each track --.

Signed and sealed this 26th day of May 1959.

(SEAL)
Attest:

KARL H. AXLINE                                           ROBERT C. WATSON

Attesting Officer                                       Commissioner of Patents